April 21, 1964 K. H. WOLVERTON 3,129,574
WASHER-EXTRACTOR HAVING A DUMP VALVE OPERATED
BY THE MEANS THAT EFFECTS THE CHANGE
OF BASKET SPEED
Filed Nov. 16, 1962
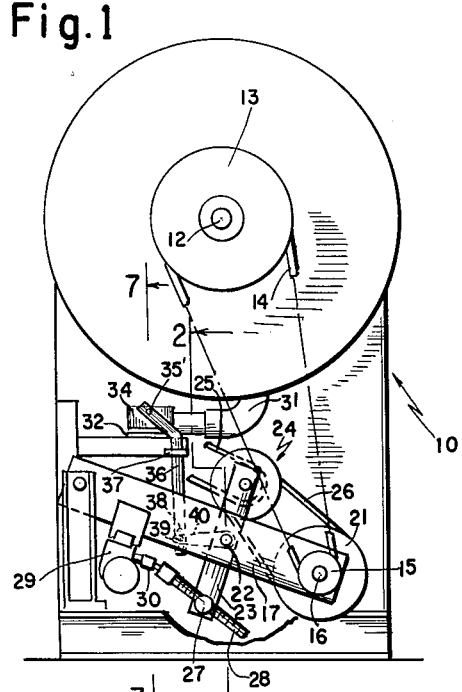
Fig. 1
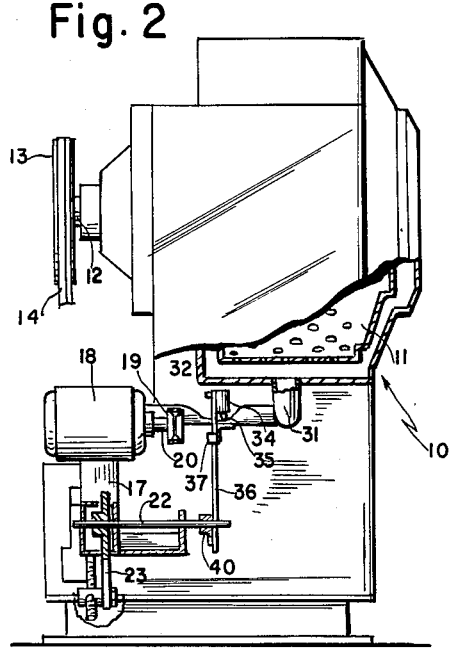
Fig. 2
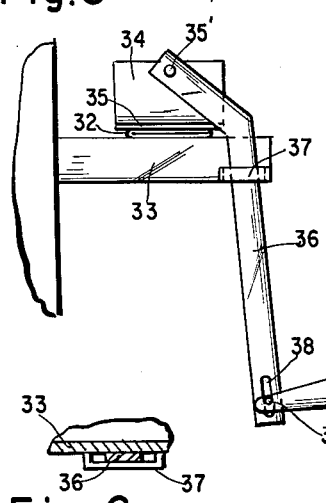
Fig. 3
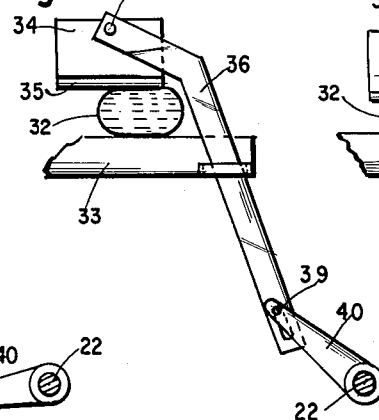
Fig. 4
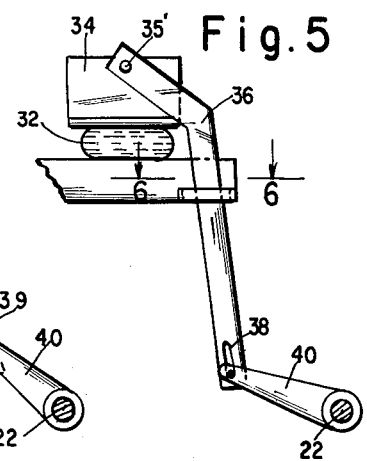
Fig. 5
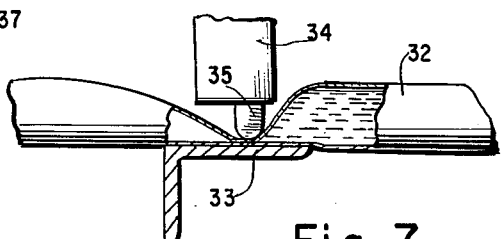
Fig. 6
Fig. 7
INVENTOR
KENNETH H. WOLVERTON
BY
Robertson ay Smythe
ATTORNEYS United States Patent Office 3,129,574
Patented Apr. 21, 1964

3,129,574
WASHER-EXTRACTOR HAVING A DUMP VALVE OPERATED BY THE MEANS THAT EFFECTS THE CHANGE OF BASKET SPEED
Kenneth H. Wolverton, Moline, Ill., assignor to Ametek, Inc., New York, N.Y., a corporation of Delaware
Filed Nov. 16, 1962, Ser. No. 238,088
6 Claims. (Cl. 68—24)

This invention relates to washer-extractors and particularly to an improved washer-extractor dump valve arrangement.

The principal object of the invention is to provide an arrangement of a washer-extractor having a variable speed drive for the basket thereof and which includes a mechanically operated dump valve for the basket that is operated incident to the operation of the variable speed drive for the basket.

Another object of the invention is to provide such an arrangement in which the dump valve is caused to open when said basket has reached a predetermined speed of rotation and to remain closed at other speeds of rotation of the basket.

Still another object of the invention is to provide such an arrangement in which the dump valve is operated by the means that effects the change of basket speed.

In one aspect of the invention, a washer-extractor may include a housing supporting a basket adapted to be rotated at a plurality of speeds for laundering articles contained within the basket. A variable speed drive may be employed to rotate the basket, and it may comprise a support on which may be mounted at one end thereof a motor having a fixed diameter V-groove pulley on its drive shaft. A bearing at the other end of the support may journal a shaft having fixed diameter V-groove pulleys at each end of the shaft, one of which may be belted to a V-pulley on the axis of the basket.

In another aspect of the invention, a bar may be pivotally mounted on the support substantially midway of its length and at a point substantially midway between the ends of the bar. The one end of the bar may support an expansible V-groove pulley arrangement including two pulleys, one adapted to be belted to the motor pulley and the other to one of the V-groove pulleys at the other end of the support.

The end of the pivotal bar opposite that supporting the expansible pulley arrangement may include a pivotally mounted, threaded nut that threadingly receives a screw. The screw may be driven by a motor also mounted on the support.

In still another aspect of the invention, the housing supporting the basket may include a drain leading from the bottom thereof. This drain may include a length of flexible tubing that rests on an anvil member. A shoe may be mounted on a reciprocable link in such fashion that movement of the link causes the shoe to move from a position in which it collapses the flexible tubing against the anvil to close off flow therethrough, to a position where the flexible tubing is permitted to open from a collapsed position, permitting draining of the housing.

In still another aspect of the invention, the reciprocable link may be connected to one end of a lever, the other end of which is fixed to the pivot shaft for the bar that supports the expansible pulley arrangement.

As the bar is pivoted to vary the speed of the basket, it is evident that the dump valve comprising the flexible tubing and shoe is also operated.

The above, other objects and novel features of the invention will become apparent from the following specification and accompanying drawing which is merely exemplary.

In the drawing:
FIG. 1 is a rear elevational view of a washer-extractor to which the principles of the invention have been applied;
FIG. 2 is a sectional elevational view taken substantially along line 2—2 of FIG. 1;
FIGS. 3, 4 and 5 are views of various linkage positions;
FIG. 6 is a view taken substantially along line 6—6 of FIG. 5; and
FIG. 7 is a sectional view taken substantially along line 7—7 of FIG. 1.

Referring to the drawing and particularly to FIGS. 1 and 2, the principles of the invention are shown as applied to a washer-extractor comprising a housing 10 in which a perforated container 11 is shown as being mounted on a shaft 12 for rotation about a horizontal axis.

A fixed diameter V-groove pulley 13 may be fixed on shaft 12, and a V-belt 14 may connect pulley 13 to a fixed diameter V-groove pulley 15 that is fixed to a shaft 16 journaled in a bearing at one end of a support 17. The opposite end of support 17 has a motor 18 mounted thereon (shown in FIG. 2 only). The motor 18 supports a fixed diameter V-groove pulley 19 on its output shaft 20.

The shaft 16 also supports a fixed diameter V-groove pulley 21 on the same side of support 17 as pulley 19 is located. Between the motor 18 and shaft 16 on support 17 is a shaft 22 that is journaled in a bearing that passes through support 17. A bar 23 is fixed to shaft 22, and one end thereof supports an expansible V-groove pulley arrangement 24 comprising two V-groove pulleys, one substantially aligned with pulley 19 and the other with pulley 21. V-belts 25 and 26 connect pulleys 19 and 21 to the arrangement 24, all in the manner shown and described in U.S. Patent No. 3,068,677.

The end of bar 23 opposite that supporting pulley arrangement 24 supports a pivotally mounted nut 27 that threadingly receives a threaded shaft 28 that can be rotated in either direction by an electric motor 29 through a universal joint 30. From the foregoing it is evident that reverse rotation of motor 29 pivots bar 23 about the axis of shaft 22, causing variations in the speed of the basket or container 11.

Housing 10 may include a drain 31 including a section 32 of flexible tubing that may lie on an anvil 33 shown as an angle member rigidly supported by the base of the machine. A shoe member 34 having a blade 35 is mounted on a pivot pin 35' on one end of a link 36 with the shoe above the tube 32 and the link passing through a guide 37 on anvil 33. The end of link 36 opposite that supporting shoe 34 may include an elongated slot 38 that receives a pin 39 on one end of a crank arm 40. The arm 40 is fixed to shaft 22 so that when it is turned to cause variation in speed of the basket 11, the shoe 34 will be activated to effect the collapsing and release of the flexible tube 32 to control the dumping of the water within housing 10 through the drain 31. The length of slot 38 and the angular position of arm 40 on shaft 22 determine the point within the speed range of the basket 11 at which the water is drained from housing 10.

Although the various features of the improved washer-extractor and dump valve have been shown and described in detail to fully disclose one embodiment of the invention, it will be evident that changes may be made in such details and certain features may be used without others without departing from the principles of the invention.

What is claimed is:
1. In a washer-extractor, a housing; a basket rotatably mounted within said housing; a drain for said housing including a section of flexible tubing located in cooperating position relative to anvil means; a dump valve for said drain comprising shoe means adapted to be moved toward and from said flexible tubing to effect its collapse against said anvil means; a variable speed transmission for rotating said basket, said transmission including a member adapted to be moved about a pivot to vary the speed of rotation of said basket; and means responsive to the pivoting of said member for moving said shoe means against said flexible tubing to effect its collapse against said anvil means.

2. In a washer-extractor, a housing; a basket rotatably mounted within said housing; a drain for said housing including a section of flexible tubing lying on anvil means; a shoe mounted over said tube and anvil means; means for rotating said basket at a plurality of speds including oscillatable expansible pulley means; and means responsive to the oscillation of said expansible pulley means for actuating said shoe to effect the collapse and release of said flexible tubing.

3. In a washer-extractor, a housing; a basket rotatably mounted within said housing; a drain for said housing including a section of flexible tubing lying on anvil means; a shoe mounted over said tube and anvil means; means for rotating said basket at a plurality of speeds including expansible pulley means mounted on one end of a bar fixed to a pivot shaft; a link pivotally connected to said shoe; and a crank on said pivot shaft connected to said link, whereby when said bar is pivoted to activate said expansible pulley means, said link is actuated to cause said shoe to collapse and release said flexible tubing.

4. In a washer-extractor, a housing; a basket rotatably mounted within said housing; a drain for said housing including a section of flexible tubing lying on anvil means; a shoe mounted over said tube and anvil means; means for rotating said basket at a plurality of speeds including expansible pulley means mounted on one end of a bar fixed to a pivot shaft; a nut at the other end of said bar; a threaded shaft threaded into said nut; a reversible electric motor connected to said threaded shaft; a link pivotally connected to said shoe; and a crank on said pivot shaft connected to said link, whereby when said bar is pivoted to activate said expansible pulley means, said link is actuated to cause said shoe to collapse and release said flexible tubing.

5. In a washer-extractor, a housing; a basket rotatably mounted within said housing; a drain for said housing including a section of flexible tubing lying on anvil means; a shoe mounted over said tube and anvil means; means for rotating said basket at a plurality of speeds including expansible pulley means mounted on one end of a bar fixed to a pivot shaft; a link pivotally connected to said shoe; and a crank on said pivot shaft connected to said link by a lost motion connection, whereby when said bar is pivoted to activate said expansible pulley means, said link is actuated to cause said shoe to collapse and release said flexible tubing.

6. In a washer-extractor, a housing; a basket rotatably mounted within said housing; a drain for said housing including a section of flexible tubing lying on anvil means; a shoe mounted over said tube and anvil means; means for rotating said basket at a plurality of speeds including expansible pulley means mounted on one end of a bar fixed to a pivot shaft; a nut at the other end of said bar; a threaded shaft threaded into said nut; a reversible electric motor connected to said threaded shaft; a link pivotally connected to said shoe; and a crank on said pivot shaft connected to said link by a lost motion connection, whereby when said bar is pivoted to activate said expansible pulley means, said link is actuated to cause said shoe to collapse and release said flexible tubing.

References Cited in the file of this patent
UNITED STATES PATENTS
3,023,597    Buss ------------------ Mar. 6, 1962